(No Model.) 2 Sheets—Sheet 1.

S. S. GREENE.
ANIMAL TRAP.

No. 328,669. Patented Oct. 20, 1885.

WITNESSES:
Chas. Nida.
C. Sedgwick.

INVENTOR:
S. S. Greene
BY Munn & Co.
ATTORNEYS.

(No Model.) 2 Sheets—Sheet 2.
S. S. GREENE.
ANIMAL TRAP.
No. 328,669. Patented Oct. 20, 1885.
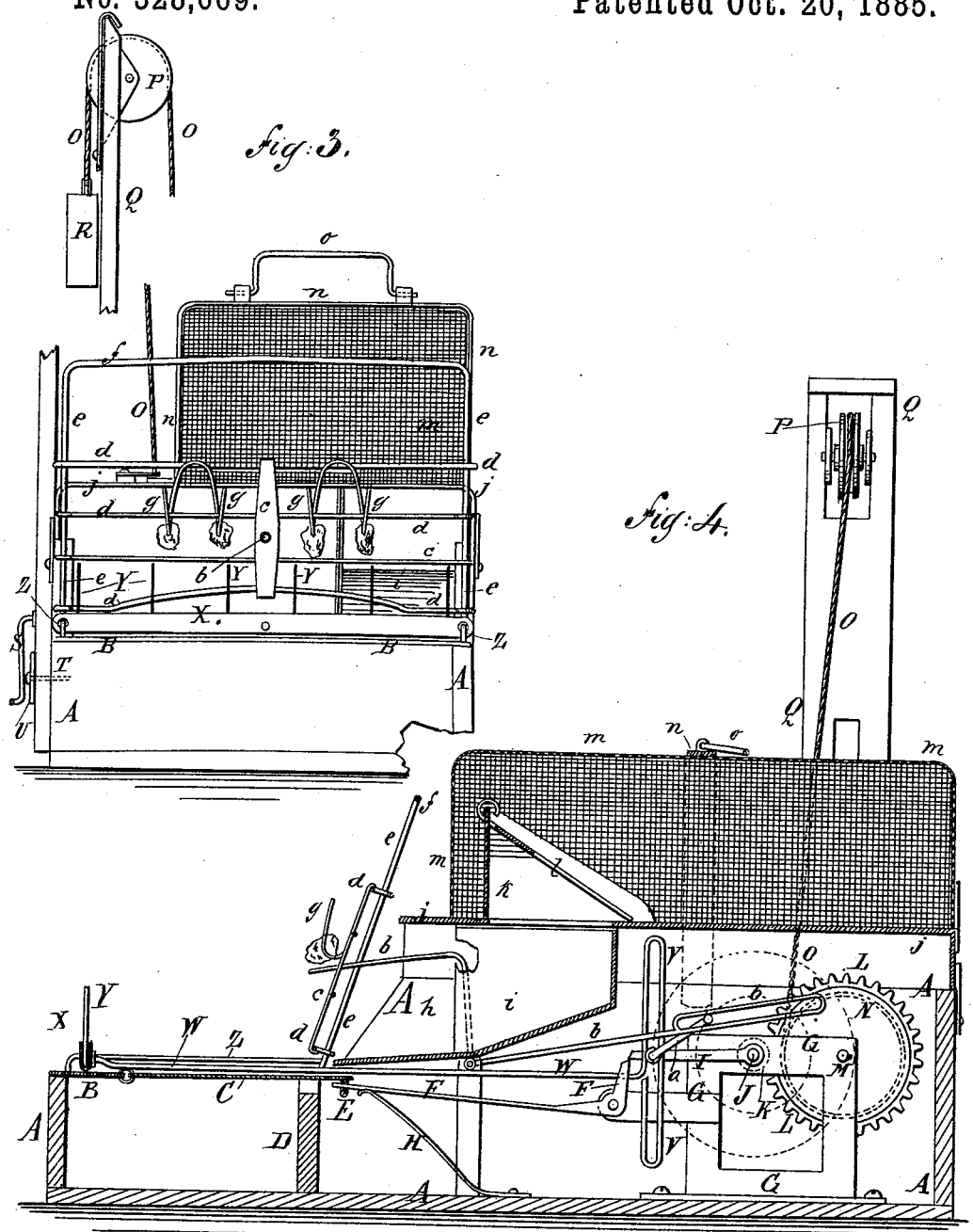
WITNESSES:
INVENTOR:
ATTORNEYS.

UNITED STATES PATENT OFFICE.

SYLVESTER S. GREENE, OF LEAD CITY, DAKOTA TERRITORY.

ANIMAL-TRAP.

SPECIFICATION forming part of Letters Patent No. 328,669, dated October 20, 1885.

Application filed May 7, 1885. Serial No. 164,664. (No model.)

*To all whom it may concern:*

Be it known that I, SYLVESTER S. GREENE, of Lead City, in the county of Lawrence and Territory of Dakota, have invented certain new and useful Improvements in Animal-Traps, of which the following is a full, clear, and exact description.

Reference is to be had to the accompanying drawings, forming a part of this specification, in which similar letters of reference indicate corresponding parts in all the figures.

Figure 1:
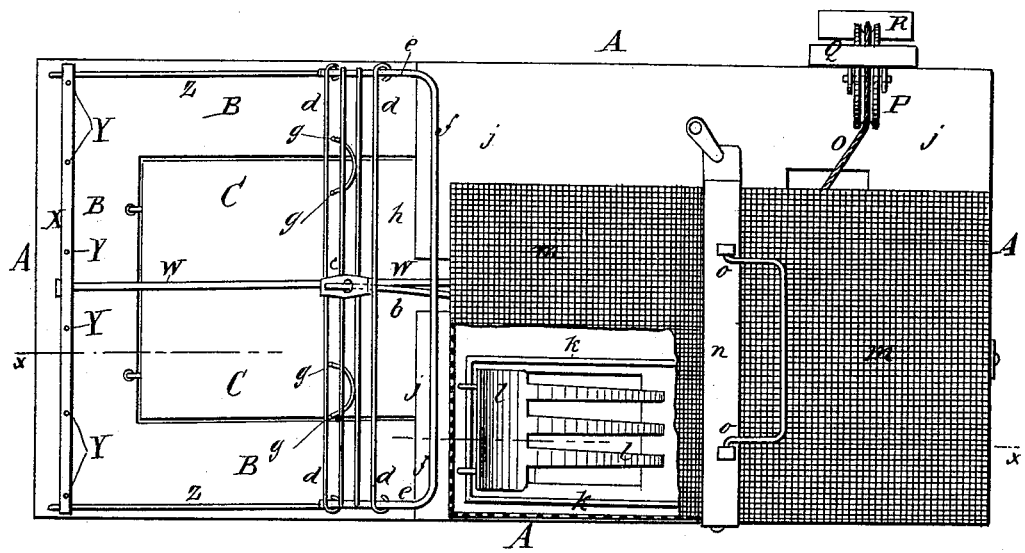
Figure 2:
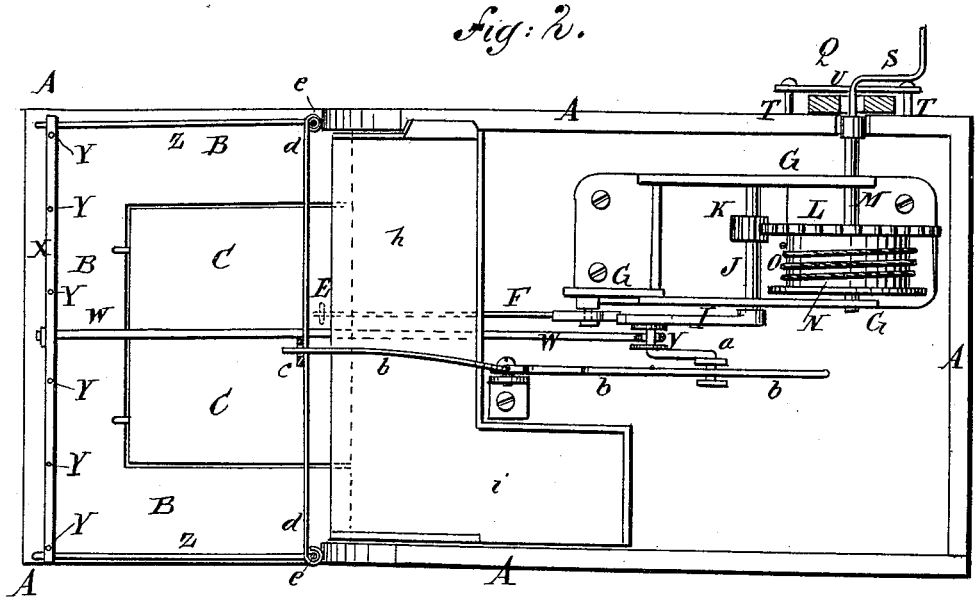

Figure 1, Sheet 1, is a plan view of my improvement, part being broken away. Fig. 2, Sheet 1, is a plan view of the same with the cage and cover removed. Fig. 3, Sheet 2, is a front elevation of the same. Fig. 4, Sheet 2, is a sectional side elevation of the same, taken through the broken line *x x*, Fig. 1.

The object of this invention is to promote convenience in catching rats and other animals, and in adjusting and setting the traps.

The invention consists in an animal-trap constructed with a box having a platform and a trap-door supported by a spring-held lever, with which engages a crank driven by a cord and weight, the said crank working in a slotted cross-head at the inner end, and a toothed bar at its outer end to be drawn by the revolution of the said crank against the animal that springs the trap, to project the said animal into a chamber formed in the upper part of the trap-box, and provided with a passage leading to an opening in the box-cover, closed by a drop-door, to admit the animal into the cage secured to the said cover. With the main crank is connected a second crank working in a longitudinal slot in the inner arm of an elbow-lever, the outer arm of which is connected with a sliding rack, so that the said rack will be raised and lowered automatically as the trap is sprung and set. The weight-cord passes over a pulley connected with a standard fastened adjustably to the trap-box, so that a longer or shorter fall can be given to the weight, as will be hereinafter fully described.

A represents a box of any convenient size and having the upper part of its forward end cut away, as shown in Fig. 4.
To the upper edge of the lower forward part of the box A is attached a platform, B, having its middle part cut away, the said cut extending to the inner edge of the said platform. In the opening thus formed is placed a trap or drop door, C, which is hinged at its outer edge to the edge of the platform B, at the outer end of the said opening.

The downward movement of the door C is limited by a bar or partition, D, which is attached to the box A in such a position that its upper edge will be at a suitable distance below the said door.

To the forward part of the door C is attached or upon it is formed a downwardly-projecting lug, E, which is perforated to receive the end of the long arm of the elbow-lever F. The elbow-lever F is pivoted at its angle to a frame, G, secured to the bottom of the box A, or to an arm attached to the said frame. The long arm of the lever F is held upward by a spring, H, the upper end of which rests against the lower side of the said arm. The lower end of the spring H is secured to the bottom of the box A. The spring H is made of sufficient strength to support the door C and prevent it from yielding until the animal has advanced so far as to bring his whole weight upon the said door. The short arm of the lever F projects upward into such a position that when the door C and the long arm of the said lever are in a raised position the end of the said short arm will be engaged by the end of the crank I, and will serve as a stop to prevent the said crank from revolving. The crank I is attached to or formed upon the end of a shaft, J, which revolves in bearings in the frame G, and has a pinion, K, attached to it. The teeth of the pinion K mesh into the teeth of the large gear-wheel L, attached to the shaft M, which revolves in bearings in the frame G, and to which or to the gear-wheel L is attached a drum, N. To the drum N is attached the end of a cord, O, which is wound around the said drum, passes over a guide-pulley, P, pivoted to bearings attached to a standard, Q, and has a weight, R, attached to its other end. The standard Q is slotted to receive the crank or key S by which the shaft M and drum N are turned to wind up the cord O and raise the weight R, and is secured to the side of the box A by screws T and a clamping-bar, U, or other suitable means, so that it can be adjusted to give a greater or less fall to the weight R, as may be required.

The crank I works in a slot in a vertical cross-head, V, formed upon or attached to the inner end of the rod W, which passes out above the door C and platform B, and is attached at its outer end to the center of a cross-bar, X. The cross-bar X is provided with upwardly-projecting teeth or pins Y, and in its ends are formed perforations to receive and slide upon the guide-rods Z, the ends of which are bent downward and are secured to the side parts of the platform B. With this construction the toothed bar X will be moved inward and outward above and close to the platform B and door C by the revolution of the crank I.

To the outer part of the crank I is rigidly attached a second crank, a, which projects inward at an angle with the said crank I and works in a longitudinal slot in the rear end of the rear arm of the elbow-lever b. The other arm of the elbow-lever b projects upward, is bent forward and passed through a hole in the plate or bar c, attached to the middle part of the rack or frame d, the ends of which slide up and down upon the rearwardly-inclined guide-bars e. The lower ends of the bars e are attached to the rear corners of the platform B, and their upper ends are connected by a rod, f, formed upon or attached to them.

To the sliding rack d are attached one or more hooks, g, for the attachment of the bait.

With this construction the depression of the door C by the weight of the animal trying to reach the bait operates the lever F to release the cranks I a, and the revolution of the cranks I a raises the rack d and draws the toothed bar X Y forward, knocking the animal into the chamber h, formed in the upper part of the box A in the rear of the rack d, when the said rack d and the toothed bars X Y instantly return to their places, and the cranks I a are again locked by the lever F.

From the chamber h a passage, i, leads to an opening in the cover j, which opening is surrounded upon its sides and one end with an upwardly-projecting casing, k, and is closed by a door, l, hinged at one end to the upper edge of the casing k, at the end of the opening in the cover j. The free end of the door l rests upon the cover j at the other end of the opening. With this construction, as the frightened animal seeks to escape from the chamber h he rushes up the passage i, raises the door l, and passes out upon the cover j, when the door l drops back to its place, and the animal finds himself in the cage m, from which he is unable to escape.

The cage m is made of woven wire or other suitable material, and is secured to the cover j by means of a strap, n, which passes over the middle part of the said cage m, and is secured to the said cover j by bolts, buttons, or other suitable means. The cover j is secured to the box A by bolts, catches, or other suitable means.

To the upper part of the strap n is attached a handle, o, for convenience in carrying the cage m and cover j.

When the animals caught are to be destroyed, the cover j is detached from the box A, and the cover j and cage m and the inclosed animals are immersed in water; or the animals are otherwise destroyed. The cage m is then detached from the cover j and the dead animals are removed, and the said cover and cage can be attached to the box A, ready to be again used.

If desired, the gear-wheel L and pinion K can be omitted, and the cord-carrying drum N can be attached to the shaft J.

The cord O and weight R can be replaced by an equivalent spring, if desired.

Having thus described my invention, I claim as new and desire to secure by Letters Patent—

1. An animal-trap constructed substantially as herein shown and described, and consisting of the box A, having platform B, trap-door C, spring-held trip-lever F, the connected cranks I a, and the driving cord and weight O R, the rod W, having slotted cross-head V at its inner end and toothed bar X Y at its outer end, the elbow-lever b, having longitudinally-slotted inner end, the sliding rack c, the chamber h, having passage i, the cover j, having drop-door l and the cage m, as set forth.

2. In an animal-trap, the combination, with the box A, the cover j, having drop-door l, and the cage m, of the chamber h and passage i, substantially as herein shown and described, whereby the animal is received and guided to the cage, as set forth.

3. In an animal-trap, the combination, with the box A, platform B, trap-door C, and chamber h, of the crank I and cord and weight O R, the rod W, having slotted cross-head V at its inner end and a toothed bar, X Y at its outer end, substantially as herein shown and described, whereby the animal that springs the trap will be projected into the receiving-chamber, as set forth.

4. In an animal-trap, the combination, with the box A, the chamber h, and the crank I, and its driving cord and weight O R, of the second crank, a, the elbow-lever b, having longitudinally-slotted inner arm, and the sliding rack d, substantially as herein shown and described, whereby the said rack will be raised and lowered automatically as the trap is sprung and set, as set forth.

5. In an animal-trap, the combination, with the box A and the cord and weight O R, of the adjustable standard Q and a fastening, T U, substantially as herein shown and described, whereby a longer or shorter fall can be given to the weight, as set forth.

SYLVESTER S. GREENE.

Witnesses:
MAX HOEHN,
H. O. ALEXANDER.